Aug. 3, 1954 J. L. SCHLITT 2,685,181
SEPARATION OF THE CONSTITUENTS OF GASEOUS MIXTURES
Filed April 30, 1952 2 Sheets-Sheet 1

INVENTOR
JOSEPH L. SCHLITT, DEC'D
EMILY C. SCHLITT, EXECUTRIX
BY
ATTORNEY

Patented Aug. 3, 1954

2,685,181

UNITED STATES PATENT OFFICE 2,685,181

SEPARATION OF THE CONSTITUENTS OF GASEOUS MIXTURES

Joseph L. Schlitt, deceased, late of Darien, Conn., by Emily C. Schlitt, executrix, Darien, Conn., assignor to Air Reduction Company, Incorporated, New York, N. Y., a corporation of New York Application April 30, 1952, Serial No. 285,174

16 Claims. (Cl. 62—122)

This invention relates to the liquefaction and separation of gases and more particularly to methods and apparatus for liquefying and separating air by utilization of the heat absorbing capacity of an extraneous body of a liquefied gas.

It is an object of this invention to provide an efficient and economical method and means for the liquefaction and separation of air into pure, gaseous oxygen and other components of air by utilizing the heat absorbing capacity of an extraneous body of a liquefied gas.

It is a further object to provide an efficient and economical method and means for the liquefaction and separation of air into oxygen-enriched air and pure gaseous and liquefied nitrogen by utilizing the heat absorbing capacity of an extraneous body of a liquefied gas.

In recent years in this country, the demands for oxygen gas for various industrial uses have increased significantly, and, as a consequence thereof, it has become common practice to transport liquefied oxygen, which is produced in a large centrally-located plant, to the place of use in order to achieve low transportation and storage costs.

Since oxygen is generally utilized as a gas, as in gas welding for instance, it is necessary that any liquefied oxygen at the site of use be converted to a gas. The usual practice at the site of large steady consumers is to vaporize the stored liquefied oxygen by means of electrically-produced or steam-produced heat. This procedure, in effect, "wastes" the heat absorbing capacity of the liquefied gas since it is not put to beneficial use and actually requires heat energy to offset the "cold." It is to be noted that the heat absorbing capacity, or refrigerative capacity, of the liquefied gas was in effect created by electrical power since the liquefaction and separation plant usually is basically dependent on electrically-powered compressors. Obviously any process which can efficiently utilize this refrigerative capacity of the liquefied gas would be highly desirable and would result in a greater overall efficiency by obtaining a more complete energy return from electricity used in the oxygen plant. It is also to be noted that an efficient process which utilizes the refrigerative capacity of a liquefied oxygen, and hence is properly arranged to gasify the liquefied oxygen, in addition to the "energy return" effects a further economy since no external, costly-to-produce heat is required to gasify the liquefied oxygen as has heretofore been used.

Often the demands for gasified oxygen are such that there is a more or less constant requirement for the gasified and pressurized oxygen. For instance, a steel mill will have extended periods when oxygen machining of billets is being done and the oxygen demand is rather steady. Within the same steel mill, or nearby at another industrial installation, there may be a demand for liquefied nitrogen (such as for metal shrink fitting) or oxygen-enriched air (such as for an aid in combustion) or gaseous oxygen for various well-known uses, including welding.

Under such circumstances it is of course apparent that, if the gasifying and pressurizing step in obtaining gaseous oxygen for pipeline distribution to welding were suitably integrated with a liquefaction and separation process for producing the components of air, appreciable economies could be effected since the heat absorbing capacity, or refrigeration, of the liquefied gas would be efficiently utilized in the production of a component of air and since no heat is required to gasify the liquefied oxygen which has been brought from the centrally-located plant.

The instant invention provides for the above-mentioned desirable advantages and objects by air separation methods which efficiently obtain their major refrigeration requirements from the gasification of a cold extraneous quantity of liquefied gas by bringing it into heat exchange relation with warm, compressed, and recycled effluent in air separation processes by the means and in the manner hereinafter described in detail.

In accordance with the methods of this invention, it is possible to obtain the two end results; (1) the separation of air into its components with various degrees of purity and in the desired gaseous or liquid phases and (2) the conversion of a liquefied gas into its gas phase which phase is suitable for industrial or other uses, with less capital investment for equipment and buildings and with less operational expenses than is required when the two end results are obtained by the individual separation and conversion installations which have been conventionally used.

Other objects and advantages of the invention will be apparent by reference to the following description and the accompanying drawings which diagrammatically illustrate apparatus for practicing the invention.

Figure 1:
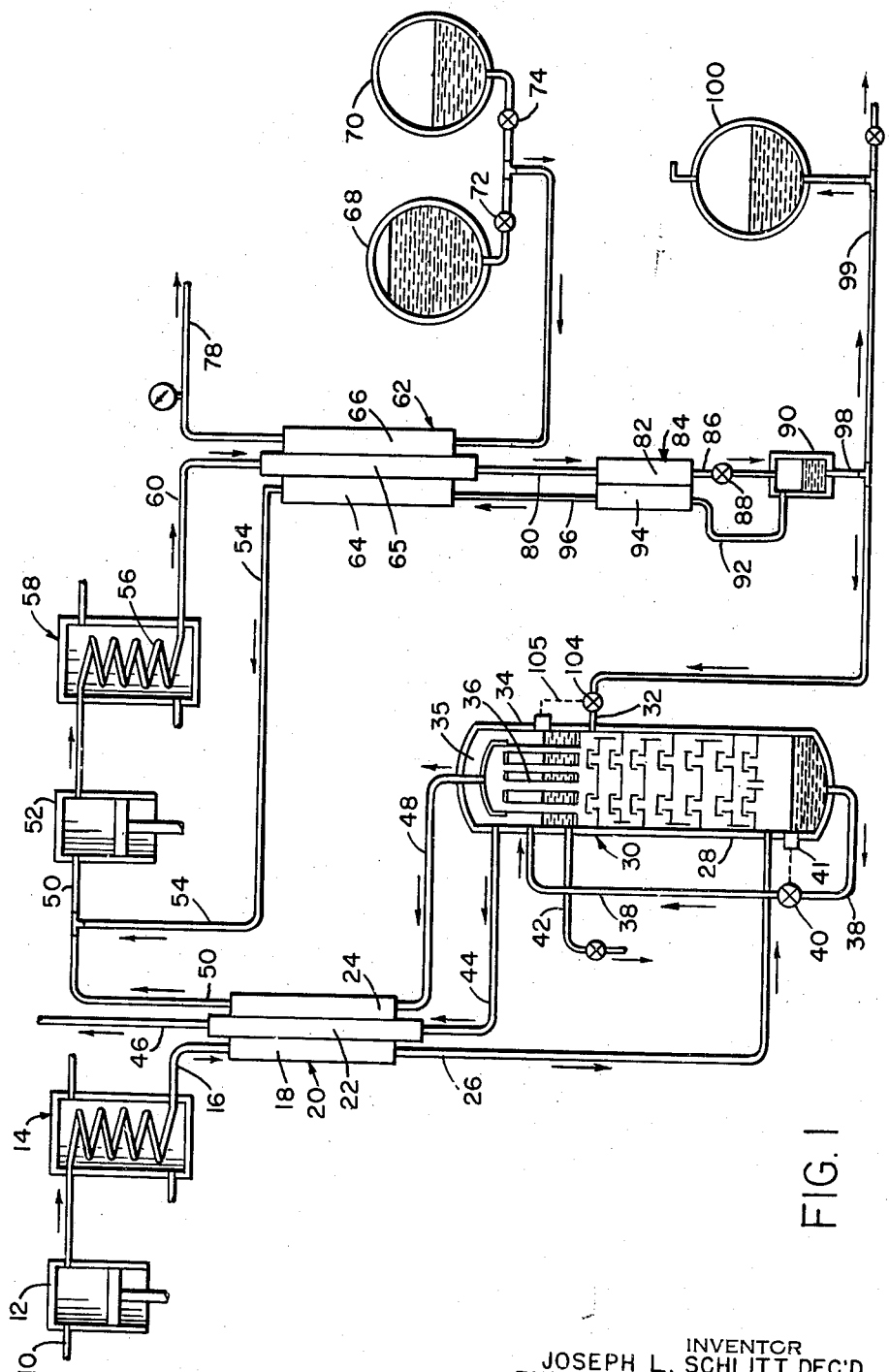
Fig. 1 shows the apparatus adapted to produce liquefied nitrogen and oxygen products, with gasification of an extraneous liquefied gas.

The apparatus shown in Fig. 1 is used to practice the instant invention in obtaining liquefied nitrogen and oxygen-enriched products by introducing air into pipe 10 and then compressing and cooling the air in compressor 12 and the water-cooled after-cooler 14. The air leaving cooler 14 is at about 30 p. s. i. g. and room temperature and flows in pipe 16 to passage 18 of heat exchanger 20 and is cooled to approximately its liquefaction point by heat exchange with counter-flowing process streams in passages 22, 24 of exchanger 20. Exchanger 20 is shown as having three parallel passages in the interests of clarity, but in practice would be a reversing heat exchanger or suitable arrangement of regenerators which are well known in the art and serve to remove the carbon dioxide and water vapor from the air. If the air in pipe 10 is purified previously by chemical means, exchanger 20 may be the usual tubular type.

The cooled, purified air leaves exchanger 20 through pipe 26 and enters the lower part 28 of the single rectification column 30. In the lower part 28 of the column 30 the upwardly flowing air is brought into intimate contact, by the conventional bubble-cap-tray construction, with liquid passing down over the trays. In this manner the air entering the column is rectified in a manner that is well known in the art. Liquid nitrogen is introduced into the column 30 by pipe 32 beneath the conventional condenser section 34 in the top of the column 30. This liquid is obtained in a manner that will be hereinafter described. Additional liquid for the rectification process in lower part 28 of the column is created by condensing the upwardly-flowing vapors on the interior of condenser tubes 36. This condensation is effected by having the tubes 36 surrounded by oxygen-enriched liquid in condenser chamber 35. This liquid is supplied by means of pipe 38 from the liquid collecting at the base of the column. This liquid will be in equilibrium with air at the pressure existing in the column (30 p. s. i. g.) and will be approximately 40% oxygen. The liquid which is withdrawn through above-mentioned pipe 38 is expanded in valve 40 and is utilized to produce the refrigeration necessary to condense nitrogen in the interior of condenser tubes 36 which extend into condenser chamber 35. Valve 40 is controlled by a conventional liquefied-gas, level control system 41 which is responsive to the level of liquid in the base of the column 30 so that a predetermined quantity of liquid is maintained. The oxygen-enriched liquid oxygen which is not evaporated in condenser 34 is withdrawn through valved pipe 42 and may be sold or otherwise used. The vapors from the evaporating liquid around tubes 36, which vapors are formed in absorbing heat from ascended nitrogen gas, pass out of condenser 34 through pipe 44 and are used to cool the incoming air by counter-currently passing through passage 22 of exchanger 20. This gas from the condenser is thus warmed up to about atmospheric temperature and leaves exchanger 20 through pipe 46. The gas, thus warmed, is then available for sale as product, or for utilization in processes requiring oxygen concentrations in the neighborhood of 40%.

The gaseous effluent, at about 25 p. s. i. g., which is not condensed in tubes 36 of column condenser 34 and collects at the top of the condenser, is withdrawn from the column by pipe 48 and passes through passage 24 of the exchanger 20. Therein the gas or effluent is warmed to about room temperature by cooling the incoming air in passage 18.

From the exchanger 20, the warmed effluent (mostly nitrogen) from the column flows through pipe 50 to recycle compressor 52. Additional warmed nitrogen joins this flow prior to compressor 52 by means of pipe 54. This additional stream of warmed nitrogen flowing in pipe 54 is derived in a manner that will be described hereinafter. Compressor 52 is any one suitable for compressing the combined stream and has conventional means (not shown) for regulating the discharge pressure. In compressor 52 the combined nitrogen stream is compressed to about 300 p. s. i. g. and is cooled to about atmospheric temperature in coil 56 of water-cooled after-cooler 58. This combined nitrogen stream is then directed by means of pipe 60 to nitrogen liquefier 62. In passage 65 of the liquefier 62 the combined nitrogen stream is liquefied by giving up heat to counterflowing nitrogen in passage 64 and counterflowing oxygen in passage 66. The oxygen is obtained from containers 68 and 70 which can be stationary or mobile and are adapted to store liquid oxygen. These containers, if stationary, can be filled with liquid oxygen from trucks or railroad cars. In the alternative, one or both of the containers can be a "semi" truck trailer or a railway tank car. In any case the containers will be suitably arranged and connected by valved conduits 72 and 74 which join liquid oxygen pipe 76 so that liquid oxygen will flow to passage 66 of liquefier 62. Pipe 76 leads to passage 66 of exchanger 62 wherein the liquid oxygen is gasified and pressurized to the desired pressure by heat exchange with compressed, relatively warm nitrogen gas in passage 65. From passage 66 the gasified and pressurized oxygen flows in pipe 78 to welding manifold (not shown) or any other system which uses oxygen. Any suitable control means can be provided to assure that the liquid oxygen is gasified and pressurized, as desired, by heat exchange with compressed nitrogen.

The liquefied nitrogen, resulting after its gaseous phase has given up heat to gasify and pressurize the oxygen in liquefier 62, passes through pipe 80 and is sub-cooled in passage 82 of sub-cooler 84. Next the nitrogen liquid passes through pipe 86 to expansion valve 88 where the nitrogen liquid is throttled to the proper pressure with the formation of vapors. These vapors and liquid in pipe 86 then are collected in receiver 90. The cold vapors are taken off from the top part of the receiver 90 in pipe 92 and are used first to subcool the nitrogen liquid in passage 82 by flowing through passage 94 and then by means of pipe 96 are led to passage 64 of nitrogen liquefier 62 where the nitrogen gas is warmed to about atmospheric temperature. Next the nitrogen gas is moved through pipe 54 to the point of juncture with pipe 50 which connects with compressor 52 and is recycled.

The nitrogen liquid which collects in receiver 90 is taken therefrom by means of conduit 98 which divides into branch pipes 32 and 99. Branch pipe 99 leads to the inlet connection of nitrogen storage container 100 and has a valved terminal portion 102 for dispensing nitrogen liquid for whatever purpose may be desired. Container 100 in practice would be suitably arranged and connected to receiver 90 so that liquefied nitrogen flows thereto by gravity or by means of a pumping system, either of which are well-known in the art.

The branch pipe 32 carrying nitrogen liquid from receiver 90 to the column 30 has a valve 104 which controls the amount of nitrogen liquid which is introduced into the lower part 28 of the column in response to the level of oxygen-enriched liquid in condenser chamber 34 by means of a conventional liquefied gas level control system 105 so a predetermined level of liquid is maintained.

From the foregoing, it can be seen that the invention provides a means for obtaining nitrogen liquid, and oxygen-enriched liquid or gas; and, at the same time, provides means for obtaining gaseous oxygen which is suitable for welding and other purposes from a quantity of extraneous liquefied oxygen in a storage container. It is to be noted that the principal refrigeration requirements for the separation process are obtained from an extraneous liquefied gas which is gasified by heat exchange with a recycled compressed process stream. In other words, in place of a "self-refrigerated" process (that is, a process in which compressed air or gas is expanded to furnish the majority of refrigeration), the instant separation process is principally refrigerated by transferring heat from a small compressed nitrogen or process stream to an extraneous body of liquefied oxygen. Thus, the air to be separated (or other gas) is compressed to a much less extent and the expansion device which is often used in commercial air separation processes is not required. Since less compression is required and the apparatus is thereby simplified, less capital investment is involved. Furthermore, since the apparatus is simplified, it can be more readily operated automatically.

Figure 2:
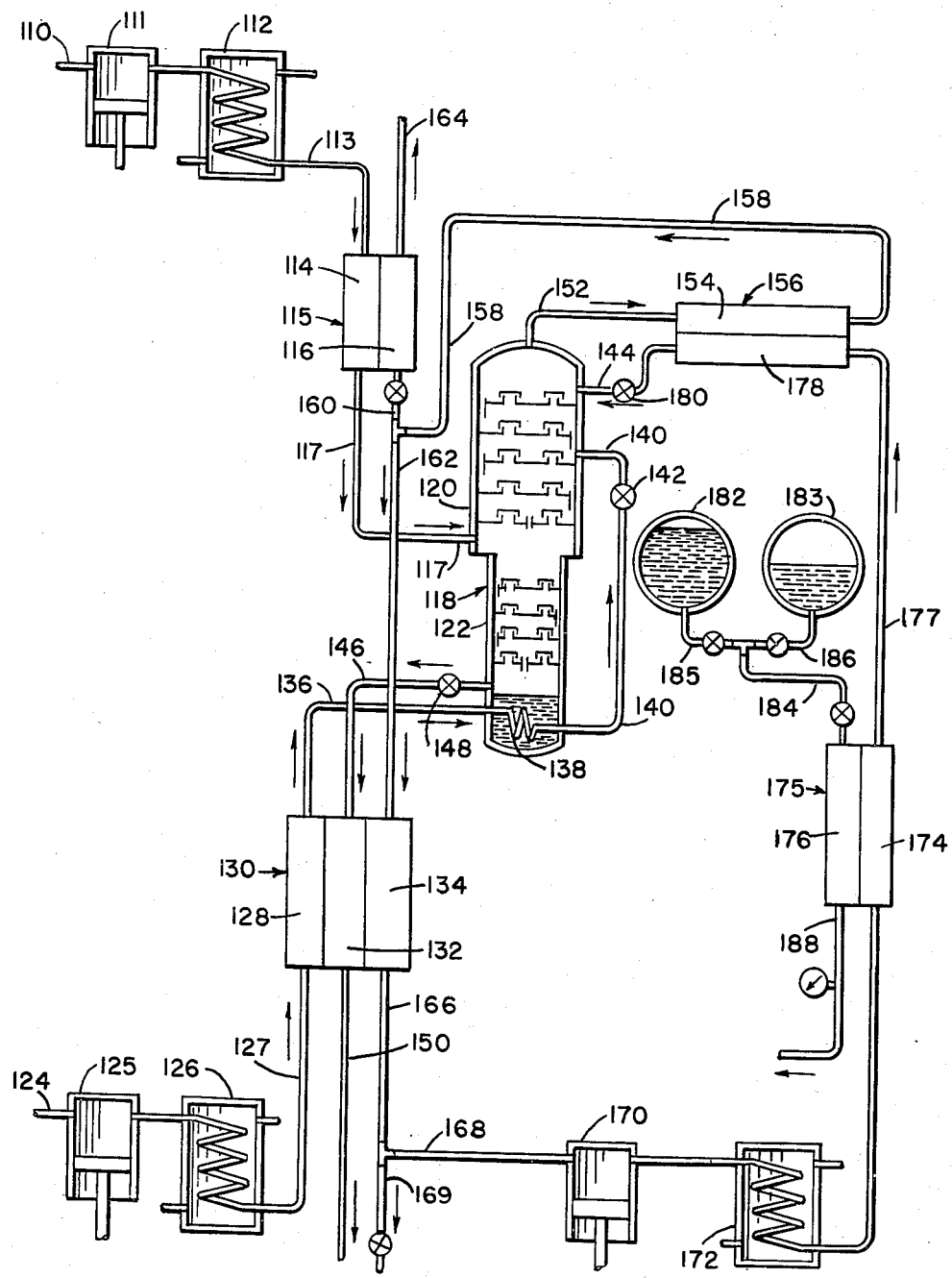
Fig. 2 shows the apparatus adapted to produce high purity oxygen with gasification of an extraneous liquefied gas.

Referring now to Fig. 2 wherein means for producing high purity gaseous oxygen by utilizing the refrigerative capacity of a liquefied gas such as oxygen is schematically depicted, it can be seen that one stream of air enters the process by pipe 110 which leads to compressor 111 and its water-cooled, after-cooler 112. This air stream is compressed to about 8–10 p. s. i. g. From after-cooler 112 the air flows through pipe 113 to passage 114 of exchanger 115. Exchanger 115 may be the reversing type or regenerative type which remove carbon dioxide and water vapor from the air if the air contains such impurities. However, if the air is purified previously by chemical means, exchanger 115 may be the usual tubular type. In exchanger 115 the air is cooled by heat exchange with a colder gaseous nitrogen stream flowing counter-currently in passage 116 of exchanger 115. This colder gaseous nitrogen is derived from air in the process in a manner which will be subsequently described.

The air under 8–10 p. s. i. g. which has been cooled to approximately its liquefaction point in exchanger 115 next flows in pipe 117 to the rectification column 118 and enters the column at the lower portion of the upper, larger cylindrical section 120 of the column.

Column 118 also has a lower section 122 which has a smaller diameter than upper section 120. Both sections are suitably provided with the well-known, tray-bubble-cap construction 122 which assure intimate contact between an upwardly-flowing gas and a descending liquid, as previously described.

Another stream of air (about 20% of the air entering the process) is admitted into the process by means of pipe 124 which leads to compressor 125 and its after-cooler 126. This additional air stream is "dried" or purified of water and carbon dioxide by conventional means (not shown) prior to entering pipe 124. In compressor 125 the air is compressed to about 55 p. s. i. g. From after-cooler 126 the air flows in pipe 127 to passage 128 of heat exchanger 130 which is the conventional tubular type. In passage 128 the air is cooled to about its liquefaction temperature by colder process streams flowing countercurrently in passages 132 and 134 of exchanger 130. These process streams flowing in passages 132 and 134 are obtained from the rectification column 120 in a manner which will be described hereinafter.

The cooled air at about 55 p. s. i. g. passes from exchanger 130 by means of pipe 136 to coil 138 in the bottom of lower section 122 of column 118. In coil 138, this air is liquefied by heat exchange with the liquefied oxygen which surrounds the coil 138. The heat released in this condensation of air is absorbed by the pool of liquid surrounding the coil 138 and hence evaporates the liquefied oxygen surrounding the coil 138. From coil 138 in the base of the column 118 the liquefied air passes through pipeline 140, is expanded at valve 142, and is introduced into a central tray in the upper section 120 of column 118 for separation into its constituents or components. This additional air and the first-mentioned air which enters the lower part of the upper section 120 of the column 118 by means of pipe 117 are both rectified in the column so that the gas at the top of column 118 is substantially pure nitrogen. The liquid which collects in the bottom of lower section 122 of the column 118 is oxygen. This liquid is that liquid which will be in equilibrium with 95% oxygen gas and so will be about 97% oxygen. This rectification process includes the introduction of liquid nitrogen for refluxing through pipe 144 adjacent to the top of the side of the column 118. This reflux nitrogen liquid is obtained in a manner which will be described hereinafter.

As previously mentioned, the cold liquefied gas which collects in the base of the column 118 is evaporated by heat exchange with the warm incoming gas in coil 138. A portion of the evaporated gas passes up through the column for rectification while another portion is withdrawn as product through pipeline 146. After passing through valve 148 in pipeline 146, the gaseous oxygen at about atmospheric pressure continues through pipeline 146 to passage 132 of heat exchanger 130 where it absorbs heat from incoming air flowing in passage 128. This warmed oxygen gas leaves passage 132 by means of pipe 150 and is available as high purity gaseous oxygen, for sale or use in blast furnaces, open hearths, and other installations.

The above-mentioned nitrogen gas or effluent which ascends through the bubble-cap-tray construction to the top of the column 118 is withdrawn through pipe 152. Pipe 152 conducts the effluent to passage 154 of subcooler 156. In subcooler 156 this nitrogen effluent from the column 118 is used to subcool liquefied nitrogen which is obtained in a manner to be described subsequently. After being warmed somewhat, the cold nitrogen effluent leaves subcooler 156 via pipe 158. The nitrogen effluent in pipe 158 is then divided into two flows by means of branch pipelines 160 and 162.

The nitrogen effluent in valved pipeline 160 flows to passage 116 of heat exchanger 115 after expansion where it cools the incoming air which was compressed to about 10 p. s. i. g. as previously mentioned. This flow of nitrogen effluent leaves exchanger 115 at about room temperature by means of pipe 164 and is then available for use in certain steel mill operations, etc., or may be discarded as waste if not desired.

The flow of nitrogen effluent from subcooler 156 which passes through branch pipeline 162 enters passage 134 of heat exchanger 130 where it is warmed to atmospheric temperature by absorbing heat from the 55 p. s. i. g. incoming air in passage 128. This nitrogen flow leaves exchanger 130 by pipe 166 which empties in two branch pipes 168 and 169. Branch pipe 169 contains a nitrogen product stream which is suitable for certain steel operations or may be discarded.

The other branch pipeline 168 contains a recycle nitrogen stream and connects to recycle compressor 170. This recycle compressor is any one suitable for compressing nitrogen and has conventional control means (not shown) which regulate the discharge pressure. The recycle nitrogen stream is compressed in compressor 170 to that pressure which is necessary for its liquefaction when in heat exchange with liquid oxygen. After compression the recycle nitrogen is cooled to substantially room temperature in aftercooler 172. Next the compressed recycle nitrogen passes to passage 174 oxygen vaporizer 175 where the recycle nitrogen is liquefied at the same time that liquefied oxygen entering passage 176 of vaporizer 175 from supply pipe 176 is gasified and pressurized. The liquefied nitrogen then flows to column 118 through pipe 177 passage 178 of subcooler 156 and pipeline 144 having expansion valve 180 and functions in the column as previously described to furnish reflux and concurrently refrigeration.

The oxygen which is vaporized in vaporizer 175 is supplied from containers 182 and 183 which are connected to valved supply pipe 184 by suitable valved conduits 185 and 186 as described in relation to Fig. 1. A pair of containers is used to provide continuous operation by switching to a filled container as one is emptied. These containers can be stationary or one or both can be railway tank cars or "semi" truck tank trailers. The oxygen, after being gasified and pressurized as above described in relation to Fig. 1 in passage 176 of vaporizer 175 is available through pipe 188 for pipeline delivery to welding, cutting or other operations.

The division of nitrogen in pipe 158 into pipes 160 and 162 is such that the balancing of the respective flows will produce the minimum amount of heat losses at the warm ends of the exchangers 115 and 130.

By making small changes, it is also possible to produce 99½% oxygen which can be used for the same purposes as the oxygen which is gasified and pressurized.

From the foregoing description of the process which is diagrammatically depicted in Fig. 2, it is believed that the advantages of the invention when adapted to the production of high purity gaseous oxygen are apparent. As with the liquid nitrogen adaptation shown in Fig. 1, the feature of supplying the major refrigeration requirements of the process from refrigeration resulting from the gasification and pressurization of an extraneous quantity of a liquefied oxygen by heat exchange with a compressed recycled process stream is an important feature and as pointed out above in connection with the liquid nitrogen adaptation of the invention, contributes substantially to similar advantages.

Although the invention has been described herein with reference to air and its components, it is to be understood that other compatible gases and gas mixtures and their ingredients having a relative similarity among themselves could be separated and gasified by the methods and apparatus herein disclosed. The term, compatible gases and gas mixtures, is to be understood as meaning gases and gas mixtures having physical and chemical characteristics which would be relatively comparable to the similarity between oxygen and air and its ingredients.

The embodiments of the invention herein described and illustrated in the accompanying drawings indicate how the invention can be utilized in two specific forms. Other forms, differing in some respects but not in essence from the disclosed embodiments of the invention will be obvious to one skilled in the art.

What is claimed is:

1. A method for the gasification of quantities of an extraneous, compatible, liquefied gas and, simultaneously therewith, the liquefaction and separation of a gas mixture which comprises cooling a compressed gas mixture to its liquefaction point, rectifying said cooled mixture to produce a relatively high boiling-point liquid and a relatively low boiling-point gas, using said low boiling-point gas from said rectifying step in said cooling step, compressing said low boiling-point gas after its use for cooling, and condensing said compressed low boiling-point gas by transferring its heat to an extraneous, compatible, liquefied gas thereby evaporating the liquefied gas and thus forming extraneous gas, and moving said extraneous gas towards a point of use.

2. A method for the gasification of quantities of an extraneous, compatible, liquefied gas and, simultaneously therewith, the liquefaction and separation of a gas mixture which comprises cooling a compressed gas mixture to its liquefaction point, rectifying said cooled mixture to produce a relatively high boiling-point liquid and a relatively low boiling-point gas, using said low boiling-point gas from said rectifying step in said cooling step, compressing said low boiling-point gas after its use for cooling, condensing said compressed low boiling-point gas by transferring its heat to an extraneous, compatible, liquefied gas thereby evaporating the liquefied gas and forming extraneous gas, moving said extraneous gas towards a point of use, and using said condensed low boiling-point gas as reflux in said rectifying step.

3. A method for the gasification of quantities of an extraneous, compatible, liquefied gas and, simultaneously therewith, the liquefaction and separation of a gas mixture which comprises cooling a compressed gas mixture to its liquefaction point, rectifying said cooled mixture to produce a relatively high boiling-point liquid and a relatively low boiling-point gas, using said low boiling-point gas from said rectifying step in said cooling step, compressing said low boiling-point gas after it use for cooling, condensing said compressed low boiling-point gas by transferring its heat to an extraneous, compatible, liquefied gas thereby evaporating the liquefied gas and forming extraneous gas, moving said extraneous gas towards a point of use, evaporating said high-boiling point liquid into a high boiling-point gas by heat exchange in said rectifying step, and bringing said high boiling-point gas into heat exchange relation with said compressed gas.

4. A method for the gasification of quantities of an extraneous, compatible, liquefied gas and, simultaneously therewith, the liquefaction and separation of a gas mixture which comprises cooling a compressed gas mixture to its liquefaction point, rectifying said cooled mixture to produce a relatively high boiling-point liquid and a relatively low boiling-point gas, using said low boiling-point gas from said rectifying step in said cooling step, compressing said low boiling-point gas after its use for cooling, condensing said compressed low boiling-point gas by transferring its heat to an extraneous, compatible, liquefied gas thereby evaporating the compatible liquefied gas and forming extraneous gas, moving said extraneous gas towards a point of use, using said condensed low boiling-point gas as reflux in said rectifying step, evaporating said high boiling-point liquid into a high boiling-point gas by heat exchange in said rectifying step, and bringing said high boiling-point gas into heat exchange relation with said compressed gas mixture.

5. A method for the gasification of quantities of an extraneous, compatible, liquefied gas and, simultaneously therewith, the liquefaction and separation of a gas mixture which comprises cooling a compressed gas mixture to its liquefaction point, rectifying said cooled mixture to produce a relatively high boiling-point liquid and a relatively low boiling-point gas, using said low boiling-point gas from said rectifying step in said cooling step, compressing said low boiling-point gas after its use for cooling, condensing said compressed low boiling-point gas by transferring its heat to an extraneous, compatible, liquefied gas thereby evaporating the liquefied gas and forming extraneous gas, moving said extraneous gas towards a point of use, expanding said condensed low boiling-point gas thereby forming vapors and a residual liquid, using said vapors in said condensing step thereby warming said vapors, and recycling said warmed vapors into the step of compressing the low boiling-point gas.

6. A method for the gasification of quantities of an extraneous, compatible, liquefied gas and, simultaneously therewith, the liquefaction and separation of a gas mixture which comprises cooling a compressed gas mixture to its liquefaction point, rectifying said cooled mixture to produce a relatively high boiling-point liquid and a relatively low boiling-point gas, using said low boiling-point gas from said rectifying step in said cooling step, compressing said low boiling-point gas after its use for cooling, and condensing said compressed low boiling-point gas by transferring its heat to an extraneous, compatible, liquefied gas thereby evaporating the liquefied gas and forming extraneous gas, moving said extraneous gas towards a point of use, withdrawing some of said condensed low boiling-point gas.

7. A method for the gasification of quantities of an extraneous, compatible, liquefied gas and, simultaneously therewith, the liquefaction and separation of a gas mixture which comprises compressing two separate flows of a gas mixture, cooling said two separate flows of compressed gas mixture to liquefaction point of the gas mixture, rectifying said cooled flows to produce a relatively high boiling-point liquid and a relatively low boiling-point gas, using said low boiling-point gas from said rectifying step in said cooling step, compressing said low boiling-point gas after its use for cooling, condensing said compressed low boiling-point gas by transferring its heat to an extraneous, compatible, liquefied gas thereby evaporating the liquefied gas and forming extraneous gas, moving said extraneous gas towards a point of use, said cooling of said two separate flows being effected in two heat exchange zones on independent flows of the gas mixture, using said low boiling-point gas from said rectifying step to cool said heat exchange zones, and dividing the flow of said low boiling-point gas to said zones so that an efficient transfer of heat occurs at the cold ends of said zones.

8. A method for the gasification of extraneous liquefied oxygen and the liquefaction and separation of air in a rectification zone by using the heat absorbing capacity of a quantity of extraneous liquefied oxygen, said method including the steps of compressing and cooling air to its liquefaction point at 30 p. s. i. g., introducing said air into the rectification zone, rectifying said air in said zone into an oxygen-enriched liquid and a nitrogen effluent, expanding said oxygen-enriched liquid into a fluid, utilizing said oxygen-enriched fluid after expansion to condense the portions of the nitrogen effluent by indirect heat exchange in the top of said zone, compressing said nitrogen effluent, liquefying said compressed nitrogen by heat exchange with extraneous liquefied oxygen thereby gasifying the oxygen, introducing a portion of said liquefied nitrogen into said zone for refluxing, and withdrawing an oxygen-enriched product and the remainder of the liquefied nitrogen.

9. A method for the gasification of extraneous liquefied oxygen and the liquefaction and separation of air in a rectification zone which comprises compressing and cooling about 20% of the total flow of air, passing said 20% air flow through liquefied oxygen in the bottom of a rectification zone, expanding and introducing said air into said rectification zone, compressing and cooling the remaining 80% of the total flow of air, introducing said 80% air flow into said rectification zone, rectifying said 20% air flow and said 80% air flow to provide said liquefied oxygen in the bottom of the rectification zone and to provide a nitrogen effluent, using said nitrogen effluent in said cooling of said 20% air flow and said 80% air flow, compressing a portion of said nitrogen effluent, liquefying said compressed nitrogen effluent by gasifying an extraneous quantity of liquefied oxygen, introducing the liquefied nitrogen effluent into said rectification zone for reflux, and withdrawing gaseous oxygen from said rectification zone.

10. A method for the gasification of quantities of an extraneous, compatible, liquefied gas and, simultaneously therewith, the liquefaction and separation of air which comprises compressing incoming air, cooling the compressed air to approximately its liquefaction point, separating the air into a low boiling-point fraction and a high boiling-point fraction by rectification, utilizing the low boiling-point fraction from said rectification to cool the compressed air, compressing the utilized fraction, liquefying the utilized fraction by gasifying said extraneous liquefied gas thereby forming extraneous gases, moving said extraneous gases towards a point of use, using said liquefied fraction for refrigeration and reflux in said separation step, and utilizing the high boiling-point fraction from said rectification to cool the compressed incoming air.

11. Apparatus of the type described for effecting simultaneously the gasification of an extraneous liquefied gas and the liquefaction and separation of a gaseous mixture comprising the combination of means for compressing and cooling a gaseous mixture, a rectification column, means for delivering the compressed and cooled gaseous mixture to the rectification column, means for withdrawing a gaseous effluent from the top of the column, an exchanger, means for compressing the gaseous effluent and for supplying the same to the exchanger, means for supplying an extraneous liquefied gas to the exchanger whereby the extraneous liquefied gas is evaporated by heat exchange with the compressed effluent and the latter is liquefied, means connected to said exchanger for directing said evaporated extraneous liquefied gas towards a point of use, and means for returning at least a portion of the liquefied effluent to the column for contact with the compressed and cooled gaseous mixture.

12. Apparatus of the type described for effecting simultaneously the gasification of an extraneous liquefied gas and the liquefaction and separation of a gaseous mixture comprising the combination of means for compressing and cooling a gaseous mixture, a rectification column including trays and a reflux condenser at the top thereof, means for delivering the compressed and cooled gaseous mixture to the rectification column, means for withdrawing a gaseous effluent from the top of the condenser, an exchanger, means for compressing the gaseous effluent and supplying the same to the exchanger, means for supplying an extraneous liquefied gas to the exchanger whereby the extraneous liquefied gas is vaporized by heat exchange with the compressed effluent and the latter is liquefied, means for returning a portion of the liquefied effluent from the exchanger to the column for contact with the compressed and cooled gaseous mixture, and means for withdrawing liquid from the bottom of the column, expanding the same and supplying it to said condenser to produce reflux liquid for the column.

13. In an apparatus for gasifying quantities of an extraneous liquefied gas and, simultaneously therewith, separating the constituents of gaseous mixtures, the combination of a rectification column, means for compressing and cooling the gaseous mixture and for delivering it to the rectification column, means for compressing and cooling another portion of the gaseous mixture, means in the bottom of the rectification column to liquefy the second portion of the compressed and cooled gaseous mixture, means for delivering the liquid to the column, means for withdrawing a gaseous effluent from the column, means for compressing part of the gaseous effluent, means for liquefying the compressed gaseous effluent by heat exchange with an extraneous liquefied gas so that said extraneous liquefied gas is gasified and means for delivering the liquefied effluent to the rectification column.

14. A process for the gasification of a quantity of an extraneous liquefied gas and, simultaneously therewith, the liquefaction and separation of a gaseous mixture comprising separating said mixture by liquefaction and rectification into a low-boiling-point fraction and a high boiling-point fraction, compressing said low boiling-point fraction to form a compressed recycle stream, gasifying the extraneous liquefied gas by passing a flow of the extraneous liquefied gas in heat exchange relation with said compressed recycle stream whereby said compressed recycle stream is liquefied to form a liquefied recycle stream, returning said liquefied recycle stream to said step of separating in such a manner as to provide reflux and refrigeration therein, and regulating the respective flow rates of said recycle stream and said extraneous liquefied gas flow so that major refrigeration requirements necessary for said liquefaction and rectification of the gaseous mixture are provided by the "cold" released by said extraneous liquefied gas flow.

15. The process according to claim 14 with the gaseous mixture being air and further including the feature of conducting said step of separating said air so that a gaseous fraction containing about 40 per cent oxygen is removed from said separation step.

16. The process according to claim 14 with the gaseous mixture being air and further including the feature of conducting said step of separating said air so that high purity oxygen results.

References Cited in the file of this patent

UNITED STATES PATENTS

| Number | Name | Date |
|---|---|---|
| 1,201,043 | Flamand | Oct. 10, 1916 |
| 1,864,585 | De Baufre | June 28, 1932 |
| 2,214,790 | Greenewalt | Sept. 17, 1940 |
| 2,496,380 | Crawford | Feb. 7, 1950 |
| 2,500,118 | Cooper | Mar. 7, 1950 |